Figure 1:
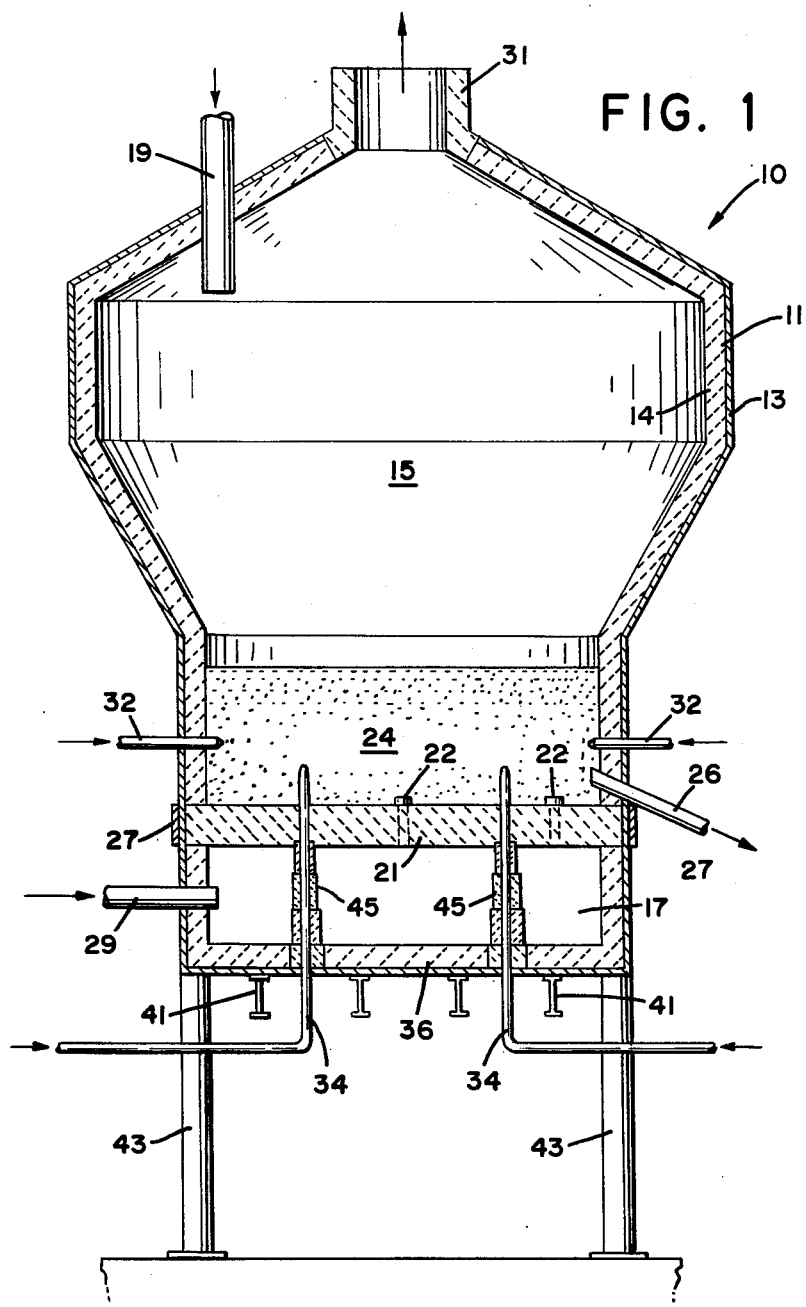

United States Patent [19]

Moorey

[11] 4,159,305
[45] Jun. 26, 1979

[54] PIER-SUPPORTED REFRACTORY CONSTRICTION ELEMENT

[75] Inventor: Ernest T. Moorey, Redding, Conn.

[73] Assignee: Dorr-Oliver Incorporated, Stamford, Conn.

[21] Appl. No.: 618,526

[22] Filed: Oct. 1, 1975

[51] Int. Cl.² ............................ B01J 8/24; B01J 8/44
[52] U.S. Cl. ................................... 422/143; 422/311; 34/57 A; 432/15
[58] Field of Search .................. 23/284, 277 R, 288 S; 34/57 A, 57 C; 432/247, 58, 14, 15

[56] References Cited

U.S. PATENT DOCUMENTS

| | | | |
|---|---|---|---|
| 2,610,842 | 9/1952 | Schoenmakers et al. | 23/288 S X |
| 2,690,962 | 10/1954 | Clarke | 23/288 S |
| 3,423,185 | 1/1969 | Ballard et al. | 23/284 X |
| 3,782,903 | 1/1974 | Kramer | 23/284 |
| 3,863,359 | 2/1975 | Grega | 432/58 X |

Primary Examiner—Morris O. Wolk
Assistant Examiner—Michael S. Marcus
Attorney, Agent, or Firm—Harold M. Snyder; Burtsell J. Kearns

[57] ABSTRACT

A refractory constriction element for large-diameter fluid bed reactors is supported by vertical refractory piers located within the windbox.

11 Claims, 7 Drawing Figures

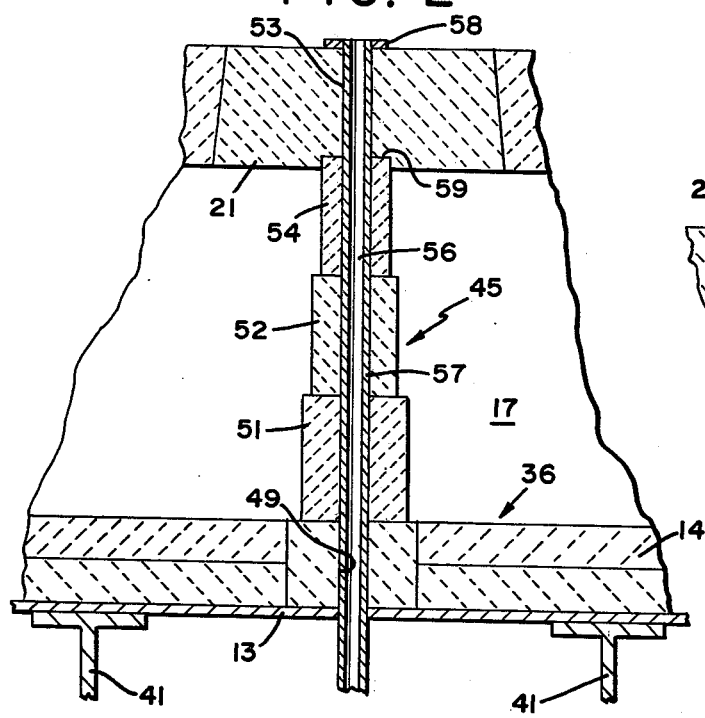
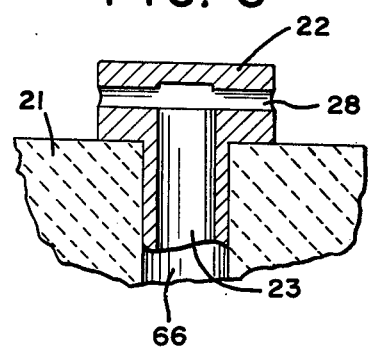
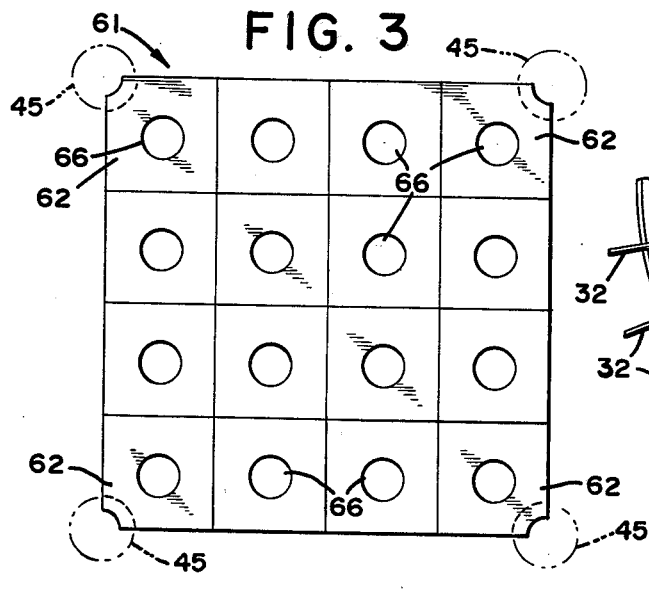
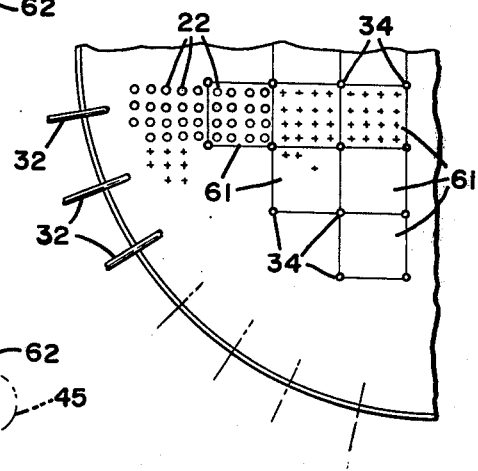
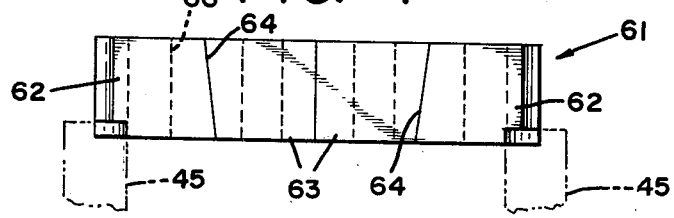

PIER-SUPPORTED REFRACTORY CONSTRICTION ELEMENT

This invention is directed to a novel refractory constriction element for a fluidized bed reactor having a hot windbox.

Fluidized bed reactors, which are very suitable for carrying out operations at elevated temperatures such as roasting, calcining and incineration, may very broadly be classified as either cold-windbox or hot-window reactors. In this classification, the cold windbox means merely that air or another gas at substantially ambient temperature is introduced into the windbox as the fluidizing gas, whereas the gases delivered to the hot windbox are at an elevated temperature, say 500°–1800° F. Constriction plates for cold windbox reactors are commonly constructed of steel, and if the diameter of the constriction plate is large, additional steel beams or support members may be provided in the cold windbox. A constriction plate of this type may be as large as required for the particular application and no limit is imposed on this size by the structural material used. A very different problem exists in the reactors designed to operate with hot windboxes, where the constriction dome is made from a refractory ceramic material. In such reactors a "sprung arch" type of construction is used in which the constriction element, which is flat on top, nevertheless presents an arched or dome-like configuration due to the concave bottom surface of the element. This is a true dome and it has reached its design limitations at about the 20 to 22-foot diameter with which certain reactors in service have been provided.

While the term "refractory" is sometimes used to describe metals which retain useful properties at elevated temperatures, in this description the term is employed only to describe materials of the ceramic type, such as pre-fired fire clay.

It is recognized that a need exists for a refractory constriction element construction which will satisfy the requirements of fluid bed reactors having diameters substantially greater than 20 feet (6.1 meters).

It is an object of this invention to provide an improved support structure for large-diameter refractory constriction elements.

It is a further object of this invention to provide an improved configuration for a refractory constriction element.

Figure 7:
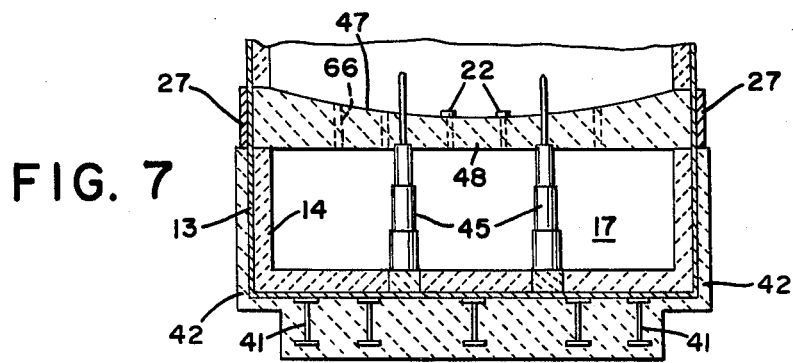

Other objects and advantages of the present invention will become apparent from the following description taken in conjunction with the accompanying drawings in which:

FIG. 1 is an elevational view, partially in section, of a fluidized bed reactor incorporating pier supports for a refractory constriction element in accordance with the present invention, FIG. 2 is an enlarged elevational view in section of a pier constructed in accordance with this invention, FIG. 3 is a plan view of a refractory module for the constriction element of this invention, FIG. 4 is a view in elevation of the refractory module of FIG. 3, FIG. 5 is a plan view of one quadrant of the constriction element of this invention showing the placement of fuel guns and tuyeres, FIG. 6 is an enlarged view in section of a tuyere and tuyere port, and FIG. 7 is an elevational view in section of a modified form of the constriction element of this invention.

Generally speaking, the refractory constriction element of the present invention is supported by refractory piers which extend through the windbox and are themselves supported by the bottom wall of the windbox.

The constriction element is comprised of a plurality of refractory elements or modules which are maintained in their predetermined horizontal positions, though subjected to expansive and contractive forces upon heating and cooling, by contact with each other and with the wall of the reactor vessel. The piers are fixed in their position relative to the constriction element since they fit into recesses provided in the bottom surface of the constriction element. The piers are hollow, with a passageway provided centrally thereof. Fuel guns are introduced through passageways in the bottom wall of the windbox, then through the central passageways of the piers and finally through suitable passageways provided in the constriction element, thus gaining access into the reaction chamber. A metal sealing sleeve is provided throughout the length of the passageways in these refractory members. This sleeve lines the passageways, thus aiding in maintaining the position of the several elements, and also provides a sealing flange which rests on the top of the constriction element around the opening of the passageway in the reaction chamber.

The constriction element is composed of refractory modules which may be integral castings, or made up of a plurality of mutually-supported refractory members or shapes. The modules are supported on the piers at the four corners thereof, with each pier providing partial support for four modules.

The diameter of the reactor in which the constriction element of the present invention is located, makes it impractical to rely entirely on feeding fuel into the fluidized bed through the side walls of the reactor. The fuel introduced through such side fuel guns penetrates only a limited distance into the reactor before combustion occurs and therefore it is desirable to introduce fuel into the central region of the constriction element through vertical fuel guns. The fuel guns are installed axially of the refractory piers to protect the fuel guns from the hot gases in the windbox.

The pier support provided in accordance with this invention makes possible a constriction element configuration not conceivable in a structure lacking the pier support. Thus, it is possible and advantageous to provide the constriction element with a dished or depressed center. Such a "reverse" constriction dome provides a deeper bed in the center of the reaction chamber and there is consequently less tendency for a disproportionately large amount of air to channel through the center of the bed as sometimes happens with the presently employed flat-topped sprung domes. In addition, such a reverse dome resists the tendency of the constriction element to be lifted by excess air flow.

Referring now to the drawings, in FIG. 1 there is shown a fluidized bed reactor 10 which incorporates the vertical refractory pier supports 45 and a disk-shaped constriction element 21 in accordance with the present invention. Thus, the fluidized bed reactor 10 has a vessel wall 11 which comprises a steel shell 13 and a refractory ceramic lining 14. The reaction chamber in the upper portion of the fluid bed reactor 10 is separated from the windbox 17 in the lower portion of the fluid bed reactor by the constriction element 21. A feed conduit 19 is provided for introducing feed stock into the reaction chamber 15. The constriction element 21 is provided with a number of tuyeres 22 for providing communication between the hot windbox 17 and the reaction chamber 15. A fluidized bed 24 is illustrated in the reaction chamber 15 and a conduit 26 is provided for removal of solid particulate products. A hot gas conduit 29 is provided for supplying fluidizing gas or air to the hot windbox 17. Conduit 31 is provided for the off-gases emanating from the reaction chamber 15. Side fuel guns 32 are provided for injecting fuel through the side wall 11 of the reactor, while bottom fuel guns 34 are vertically oriented and penetrate the windbox bottom wall 36, the windbox proper and the constriction element 21. A reinforcing band 27 surrounds the steel shell 13 at the level of the constriction element 21 to resist any shifting of the members that comprise the constriction element 21. It will be noted that the fluid bed reactor 10 is supported by the beams 41 under and in contact with the windbox bottom wall 36 and that legs 43 support the entire reactor structure in its elevated position.

In FIG. 2 further details of a load-bearing pier 45 and related structure are shown in some detail. The pier which is composed of a plurality of refractory shapes which may be circular or square in cross-section, extends between the windbox bottom wall 36 and the refractory constriction element 21 to support the latter. The refractory shapes 51, 52 and 54 are mortared at the joints thereof to form the unitary pier structure 45. The refractory shapes are prefired members and are hollow along the longitudinal axes thereof so that alignment of the refractory shapes provides an elongated passageway 56 through the structure. While the pier 45 has been shown as a refractory member composed of a plurality of elements, it should be understood that the pier might be cast as a single member, prefired and used in that form.

The pier 45 illustrated in FIG. 2 is arranged to accommodate a vertical fuel gun and for that reason is aligned with the vertical holes or passageways 49 in the windbox bottom wall 36 and the hole or passageway 53 provided at the corners off the modules 61 (as will be described hereinafter) which form the constriction element 21. A sealing sleeve 57 is provided which runs through the aligned passageways 49, 56 and 53, respectively, in the windbox bottom wall 36, the refractory shapes of pier 45 and the refractory element 21. This sleeve will be composed of metal such as alloy steel and is provided at the upper end thereof with a sealing flange 58 which rests on the top surface of the constriction element 21 and has the function of preventing leakage of fuel from the reactor chamber 15 to windbox 17 along the passageway 53. The topmost refractory shape 54 projects into a recess 59 provided in the constriction element 21 to positively locate the pier structure. A portion of the reactor shell 13 with its refractory lining 14 and support beams 41 is also visible in FIG. 2. In FIGS. 3 and 4 a roughly square module 61 of the type employed to form the constriction element 21 is illustrated in plan and elevational views. It will be seen that the module 61 is composed of a plurality (in this case, sixteen) of brick-like refractory shapes. The corner refractory shapes 62 have quadrant cutaways which with adjoining modules will form a circular passageway 53 such as that illustrated in FIG. 2. In addition, the corner refractory shape 62 has at the bottom thereof a quadrant recess which together with adjoining modules forms the recess 59 which receives the topmost refractory shape 54 (again as illustrated in FIG. 2) of pier 45. The refractory shapes 62 are provided with a supportive inclined surface 64 which with a complementary surface on the supported refractory shapes 63 makes each module self-supporting, provided the modules are restrained against horizontal movement. The joints between the refractory shapes may, of course, be joined with refractory mortar. Each of the refractory shapes is provided with a tuyere port 66.

It should be noted that the module 61, rather than being formed of a plurality of individual refractory shapes, may be formed as a unitary member from a castable refractory material.

FIG. 5 shows the relationship of the fuel guns (both side fuel guns and bottom fuel guns) and the constriction element modules. A quadrant of the constriction element is illustrated in the figure and it will be noted that a plurality of side fuel guns 32 are also illustrated. The modules 61 forming the constriction element 21 are all provided with tuyeres 22. In the central region of the constriction element, where the fuel from fuel guns 32 cannot be expected to penetrate, the constriction element 21 is provided with the vertical fuel guns 34. As will be noted, and this has been explained hereinabove, the fuel guns are located at the corners of the modules 61.

FIG. 6 illustrates a typical non-sifting tuyere 22 positioned in the tuyere port 66 in the constriction element 21. The tuyere 22 has a central bore 23 which acts as a plenum chamber for the horizontal ports 28 provided in the tuyere.

FIG. 7 illustrates a modified form of the refractory element illustrated in FIG. 1. The modified refractory constriction element 48 has a depressed central portion thereof 47 which constitutes in effect a "reverse dome." This structure has two principal advantages, one being that the inverted dome structure resists lifting forces developed by the air pressure in the windbox, and, since the center of the fluidized bed on the constriction dome 48 is deeper in the center than at the edges, air introduced through tuyeres 22 into the central region of the bed is less likely to channel through the bed at the center thereof, and a more uniform distribution of air can therefore be achieved. This modified form of the invention also shows the provision of a blanket of insulation 42 surrounding the reactor shell 13 below the level of the constriction dome 48. The purpose of the insulating blanket 42 is to minimize the differential dimensional change between the constriction dome 48 and that portion of the steel shell 13 which forms a part of the windbox bottom wall 36. Thus, in a structure lacking the insulating blanket 42, upon heating, the constriction dome 48 would tend to expand more than the windbox bottom wall 36 exposed as it is to ambient temperatures. The windbox bottom wall 36 would therefore expand less than the constriction dome 48 and the top of the piers 45 would tend to move radially outward more than the base of the piers. Such tilted piers threaten the support and therefore the integrity of the constriction dome 48. It is preferable, too, that the insulating blanket 42 surround and insulate the support beams 41 as well as the reactor shell 13 since the support beams are in contact with the reactor shell. The insulating blanket may, of course, also be provided on the embodiment shown in FIG. 1.

There has thus been disclosed a novel refractory constriction element structure which is particularly suitable for fluidized bed reactors having large bed diameters and in which a hot windbox type of operation is employed. While the illustrated embodiments of the invention all incorporate fuel guns, in some circumstances fuel guns are not required in the reactor, and in such cases, the piers may be solid refractory shapes rather than the pierced shapes shown. Also, in those parts of the reactor where vertical fuel guns are not employed, the longitudinal passageways in the piers and constriction element may be plugged with refractory mortar.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A fluid bed reactor comprising a reaction chamber, a hot windbox having a bottom wall, said hot windbox being partitioned from said reaction chamber by a refractory constriction element, said constriction element having a diameter greater than twenty feet (6.1 meters) and adapted to support thereon a body of particulate solids subject to fluidization, a plurality of elongated load-bearing refractory piers extending between said bottom wall and said constriction element to support said element, said piers extending into contact with positioning means provided on said constriction element, said piers each having a longitudinal passageway therethrough for alignment with vertical mating passageways in said bottom wall and said constriction element, and vertical fuel guns positioned in at least some of said aligned passageways for introducing fuel into said reaction chamber.

2. The fluid bed reactor of claim 1 wherein the structure of the constriction element is such that the weight thereof is exerted upon supporting structure substantially without a horizontal component and wherein each of said fuel guns extends from below said windbox through the aligned passageways in said bottom wall, said pier and said constriction element and projects into said reaction chamber above said constriction element.

3. The fluid bed reactor of claim 2 wherein the constriction element has a disk-like configuration and wherein said longitudinal passageway in said piers and said vertical mating passageways in said bottom wall and said constriction element are provided with a sealing sleeve lining the passageways and having a sealing flange at the upper end thereof which is in contact with the top surface of said constriction element about said fuel gun.

4. The fluid bed reactor of claim 3 wherein said constriction element comprises a plurality of roughly square refractory modules each supported at the four corners thereof by four of said refractory piers, said modules each having a plurality of tuyere ports therein.

5. The fluid bed reactor of claim 4 wherein said refractory modules each comprise a plurality of mutually supportive refractory shapes spanning the distance between adjacent piers.

6. The fluid bed reactor of claim 5 wherein said constriction element has an inverted dome configuration.

7. The fluid bed reactor of claim 6 wherein said positioning means comprise recesses in the windbox side of said constriction element in which the upper extremities of said piers are seated.

8. The fluid bed reactor of claim 3 wherein the constriction element has a configuration presenting a depressed concave surface to the reaction chamber.

9. The fluid bed reactor of claim 3 wherein said fluid bed reactor comprises a vessel composed of a steel shell with a refractory lining and wherein that portion of said steel shell which contains said windbox is entirely enveloped within an insulating layer so that the differential thermal expansion and contraction of said constriction element and said bottom wall is minimized, thereby limiting differential lateral movement of said load-bearing piers.

10. The fluid bed reactor of claim 4 wherein said constriction dome has an inverted dome configuration.

11. A fluid bed reactor comprising a reaction chamber, a hot windbox having a bottom wall, said hot windbox being partitioned from said reaction chamber by a refractory constriction element, said constriction element having a diameter greater than twenty feet (6.1 meters) and adapted to support thereon a body of particulate solids subject to fluidization, a plurality of enlongated load-bearing refractory piers extending between said bottom wall and said constriction element to support said element, said constriction element comprising a plurality of roughly square refractory modules, each supported at the four corners thereof on four of said refractory piers, each of said modules comprising a plurality of mutually supportive refractory shapes spanning the distance between the piers supporting each module, said modules each having a plurality of tuyere ports therein and the upper extremities of said piers extending into recesses formed in the windbox side of said refractory modules to position said piers.

* * * * *